Aug. 7, 1934. A. W. BOLLARD 1,969,545
MIXER FOR ROAD MATERIALS
Filed July 30, 1932
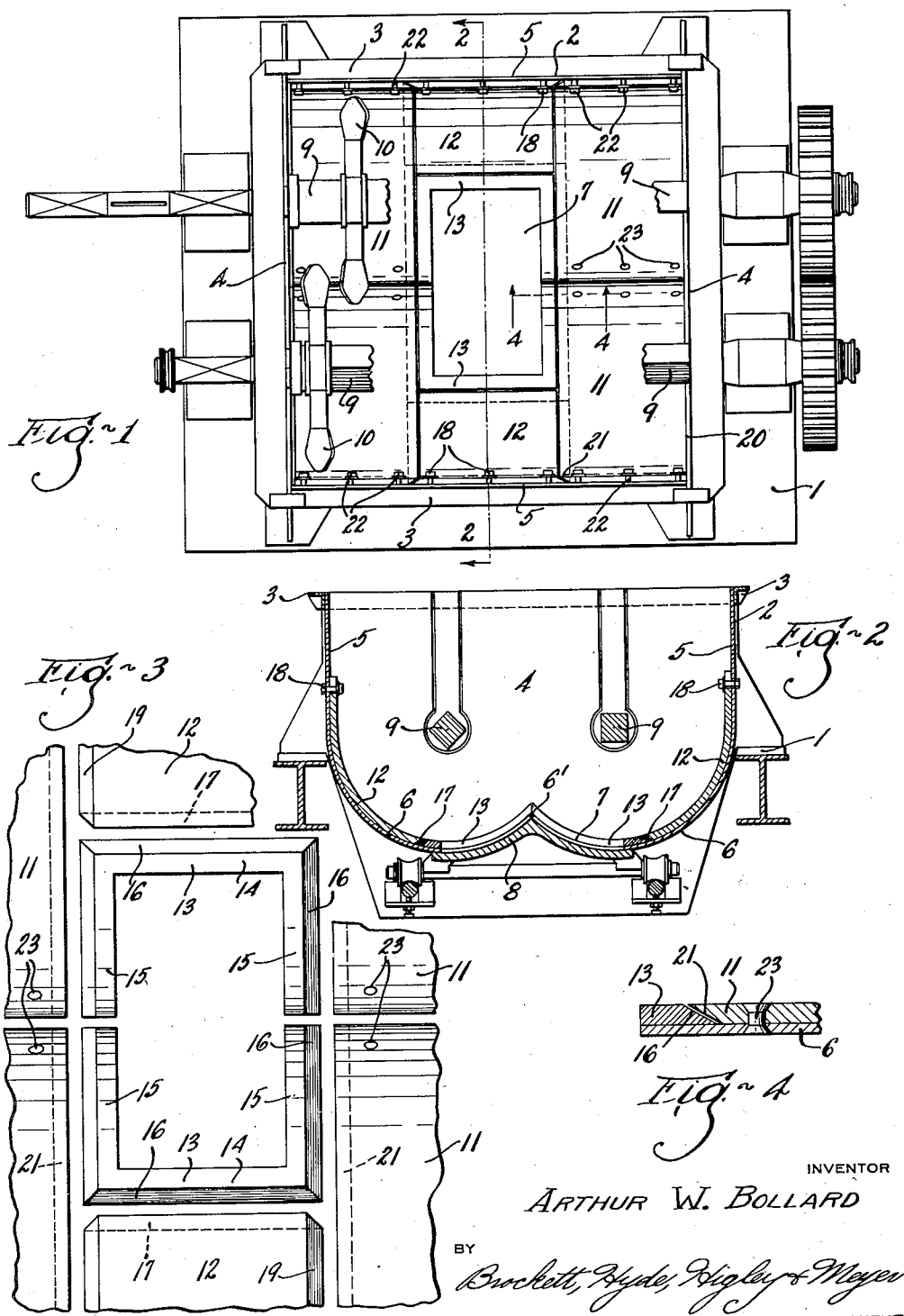

Patented Aug. 7, 1934

1,969,545

UNITED STATES PATENT OFFICE 1,969,545

MIXER FOR ROAD MATERIALS

Arthur W. Bollard, Cleveland Heights, Ohio, assignor to The F. D. Cummer & Son Company, Cleveland, Ohio, a corporation of Ohio Application July 30, 1932, Serial No. 626,488

6 Claims. (Cl. 259—104)

This invention relates to mixing machines such as are used for mixing crushed rock of various sizes with asphalt or other binding materials. The invention has to do more particularly with the linings of such mixers, its object being to provide a lining comprising sheets which are so formed and so related to each other as to be more or less interlocking at their edges, whereby the members of the lining secure or hold each other in place, the final securement being accomplished with a minimum number of bolts, rivets, or like securing devices, with the final result of so simplifying the securement that original assembly of the mixer is expedited and simplified and replacement of any of the lining members becomes a relatively simple task.

Further objects of the invention are in part obvious and in part will appear more in detail hereinafter.

In the drawing, which represents one embodiment of the invention, Fig. 1 is a plan view, portions of the beaters being omitted for simplicity of illustration; Fig. 2 is a cross section on the line 2—2, Fig. 1, looking in the direction of the arrows; Fig. 3 is a plan view, on a larger scale, showing several of the members of the lining laid in proper relative arrangement but with their edges separated; and Fig. 4 is a detail section, on a larger scale, on the line 4—4, Fig. 1.

As to most of its features, the mixer forming the subject matter of the present invention is of the same general form and construction as the mixer illustrated in a prior Patent No. 1,741,013, for Mixer for road materials, granted December 24, 1929 to Frederick H. Cummer, to which reference may be had for a more complete description if desirable or necessary. Briefly described, the mixer comprises a suitable frame 1 provided with a shell or casing 2 made of sheet metal of proper thickness and strength, the shell being reinforced around its edges in any suitable manner, such as by the angle irons 3. Said shell is so formed as to provide a cavity for containing the materials to be mixed, said cavity being defined by the opposite, parallel straight end walls 4, side walls 5, and a bottom 6, the latter being curved in two cylindrical parts around the axes of the beater shafts to be later referred to, in a manner to provide a saddle shaped crest or ridge 6' provided with a central rectangular opening 7 closed by a suitable movable gate or valve member 8. Across the cavity, between the two end walls 4 thereof, extend two parallel shafts 9 provided with beaters 10, the rotation of said shafts and beaters being adapted to stir up and mix the materials within the cavity.

The frame and shell parts so far described are made of ordinary steel or iron. However, it is desirable to increase the resistance to wear of the inner surfaces of the shell where the latter is curved and lies fairly close to the ends of the beaters, and where the wear is concentrated. It is customary, therefore, in mixers of this kind to provide the mixer, within its shell, with a lining formed of some material having a high resistance to wear by abrasion, such, for example, as manganese steel or the like. This material is not only expensive, but it is very difficult to work, particularly by a cutting operation, and it is usually necessary to cast it in as nearly finished form as possible, the most that can be done to it being to grind off rough spots to a limited degree. I therefore provide my mixer with a lining of manganese steel or other abrasion resisting sheets cast to proper form and secured within the shell and closely fitting the inner surfaces of the shell sheets. This lining I form, in the arrangement shown, in eight separate parts, to wit, four end members 11 which are alike in all respects except that two are right-handed and two left-handed, two intermediate side members 12 of identical form, and two intermediate center members 13, which likewise are of identical form. While the mixer is rectangular in plan view, for convenience in description that dimension of the mixer in the direction of the lengths of the beater shafts will be referred to as longitudinal and the dimension at right angles thereto as transverse.

The center members 13, generally speaking, are of U-shape in plan view in that they each include a longitudinally extending body portion 14 and two transversely extending arms 15. In end view, as shown in Fig. 2, they are curved to cylindrical form. The two members 13 together surround or embrace the edges of the discharge opening 7. These center members are not directly fastened to the shell in any manner, such as by bolts, rivets or the like, but they are secured and confined in place wholly by the grip or hold or confining action of the edges of the adjacent members of the lining. This result is accomplished by an overhang of the edges of the surrounding members upon the edges of the members 13. As shown in Fig. 3, the outer edges of members 13 are bevelled off at 16, the bevel in all directions being outwardly and downwardly. The longitudinal body portions 14 are held in place or confined by correspondingly but reversely inclined or undercut longitudinal edges of the side members 12, as shown at 17, and the members 12 are held in place by removable bolts 18 passing through slots in their upper edges and through the adjacent shell wall, as well as by the overhang of the adjacent end members 11, for which purpose the transverse edges of the side members 12 are outwardly bevelled, as at 19.

The end members 11 have their transverse edges which lie adjacent to the end walls 4 cut off square at 20, as is usual, while their transverse edges which lie adjacent to members 12 and 13 are undercut on a bevel, as at 21, so that the end edges of the members 11 overlap the adjacent edges of the members 12 and 13.

Members 11 are secured in place by removable bolts 22 passing through slots in their upper edges and through the wall of the shell, as with the bolts 18, and at their inner longitudinal edges, adjacent the crest 6, they are fastened to the shell in any suitable manner, such as by rivets 23 or other equivalent securing devices.

With this arrangement it will be observed that members 11 are directly secured to the shell at both their outer and inner longitudinal edges. They serve to secure and hold in place the transverse edges of both members 12 and 13. Members 12 in turn have their outer upper edges secured directly to the shell and their inner longitudinal edges serve to confine the corresponding edges of members 13. As a result, the work of installing separate members of the lining, or of replacing the same, is materially reduced. Heretofore the several members of a lining have been secured to the shell only by the use of rivets, bolts or the like, spaced around all edges thereof, and not only did the original assembly require manipulation of all these rivets or bolts, but also, replacement of any worn member of the lining required shearing out the rivets from beneath for the removal of the worn member, and the insertion of new rivets for attachment of the replacing member. Bolts have been used only along the upper edges of the lining members, those edges of the members beneath the beater shafts being ordinarily attached by rivets with countersunk heads.

In my improved arrangement replacement of one of the members 13, for example, requires punching out but three rivets in one of the end members 11 and removal of the detachable bolts 22 and 18 in the said member 11 and the adjacent member 12. Removal of the members 11 and 12 frees the member 13, which can be replaced, after which the parts 11 and 12 can be restored to position and again secured. This arrangement very materially reduces not only the cost of replacement but also the time the mixer is out of service.

What I claim is:

1. A mixer of the character described, comprising a box-like body provided with a shell and having an open top, opposite vertical end and side walls and a bottom formed in two parallel part cylindrical portions meeting in a longitudinally extending ridge, the bottom having a central discharge opening, and a lining for said bottom supported by the shell and formed of material resistant to abrasion and metal working operations, said lining including an inner border portion surrounding the edges of said opening and free of attachment to the shell, the outer edges of the border portion sloping downwardly away from said opening, and outer lining members distributed around and having their inner edges overlying and forming a cavity to receive the sloping edges of the border portion, the border portion including a plurality of members which abut each other end to end and are so formed and arranged that all of said members are mutually dependent and each is non-removably confined in said recess by the presence of all other members.

2. A mixer of the character described in claim 1, the border portion including two members of substantially U-shape in plan view and each having two side arms, the ends of the side arms of the two members meeting at the crest of said ridge.

3. A mixer of the character described in claim 1, the outer members including four end members one in each of the four corners of the body bottom.

4. A mixer of the character described in claim 1, the outer members including four end members one in each of the four corners of the body bottom, and two intermediate side members each laterally opposite the discharge opening, each side member at its inner edge overlying the border portion, and each end member overlying a part of the border portion and an edge of an intermediate member.

5. A mixer of the character described in claim 1, the outer members including four end members one in each of the four corners of the body bottom, said end members being arranged in two pairs, the members of each pair being laterally opposite to each other and their inner longitudinal edges meeting at the crest of the ridge.

6. A mixer of the character described, comprising a box-like body provided with a shell and having an open top, opposite vertical end and side walls and a bottom formed in two parallel part cylindrical portions meeting in a longitudinally extending ridge, the bottom having a central discharge opening, and a lining for said bottom supported by said shell and formed of material resistant to abrasion and metal working operations, said lining including an inner border portion surrounding the edges of said opening and free of attachment to said shell, the outer edges of the border portion sloping downwardly away from the opening, and outer members attached to the shell and distributed around and having their inner edges overlying and forming a cavity to receive the sloping edges of the border portion, said outer members including four end members, one in each of the four corners of the bottom, and two intermediate side members each opposite the discharge opening, the border portion including a plurality of members which abut each other end to end and are so formed and arranged that all of said members are mutually dependent and each is non-removably confined in said recess by the presence of all other members.

ARTHUR W. BOLLARD.